United States Patent [19]
Kidd et al.

[11] Patent Number: 4,638,131
[45] Date of Patent: Jan. 20, 1987

[54] STEERING WHEEL PAD KEYBOARD SWITCH ASSEMBLY

[75] Inventors: Richard L. Kidd, Sterling Heights, Mich.; Jerry A. Graf, Cortland, Ohio; Philip J. Engler, Leavittsburg, Ohio; Song-Chin S. Lu, Vienna, Ohio

[73] Assignee: General Motors Corporation, Detroit, Mich.

[21] Appl. No.: 818,955

[22] Filed: Jan. 15, 1986

[51] Int. Cl.⁴ .................... H01H 9/00; H01H 13/70
[52] U.S. Cl. .................... 200/61.55; 200/5 A
[58] Field of Search ............... 200/5 A, 61.54–61.57, 200/302.2, 314, 317, 340

[56] References Cited

U.S. PATENT DOCUMENTS

| | | | |
|---|---|---|---|
| 2,491,968 | 12/1949 | Gilbert | 455/230 |
| 2,682,251 | 6/1954 | Neugass | 116/328 |
| 2,863,015 | 12/1958 | Ahrens | 200/61.54 |
| 3,544,743 | 12/1970 | Takei et al. | 200/61.54 |
| 3,978,297 | 8/1976 | Lynn et al. | 200/302.2 X |
| 4,177,501 | 12/1979 | Karlin | 362/26 |
| 4,288,672 | 9/1981 | Puccini | 200/314 |
| 4,343,975 | 8/1982 | Sado | 200/317 X |
| 4,365,120 | 12/1982 | Pounds | 200/314 X |
| 4,374,310 | 2/1983 | Kato et al. | 200/61.54 |
| 4,383,148 | 5/1983 | Arima et al. | 200/61.54 |
| 4,400,012 | 8/1983 | Otsuka | 280/777 |
| 4,409,584 | 10/1983 | Arima et al. | 340/22 |
| 4,421,960 | 12/1983 | Arima et al. | 200/61.54 |
| 4,438,425 | 3/1984 | Tsuchida et al. | 340/55 |
| 4,456,903 | 6/1984 | Kishi et al. | 340/54 |
| 4,489,227 | 12/1984 | Lamarche | 200/314 |
| 4,555,600 | 11/1985 | Morse | 200/302.2 X |

OTHER PUBLICATIONS

K–B Denver, Inc. Designer's Guide, "Snap Dome Switch Technology, p. 6.

Primary Examiner—J. R. Scott
Attorney, Agent, or Firm—F. J. Fodale

[57] ABSTRACT

A steering wheel pad keyboard switch assembly is mounted on a steering wheel. The preassembled switch assembly comprises a base, a printed circuit board which has an array of open contact grids, an elastomeric switch member which has an array of movable contacts, a guide plate and a push button sub-assembly. The guide plate has a plurality of guide bosses and guide holes disposed in the same predetermined array for guiding the stem pieces of the push buttons into operative contact with the movable contacts of the switch member and a pad portion for supporting a horn switch. The push button sub-assembly comprises a frame member which is attached to the base to provide the unit handle switch assembly, a plurality of push buttons which are slideably retained in respective slide chambers of the frame and a soft decorative cover which includes a depressible horn switch pad to operate the horn switch and cut-outs to provide access to the push buttons. The guide plate and the stem pieces of the push buttons are made of a translucent material and form part of the back lighting system for the push button legends.

7 Claims, 5 Drawing Figures

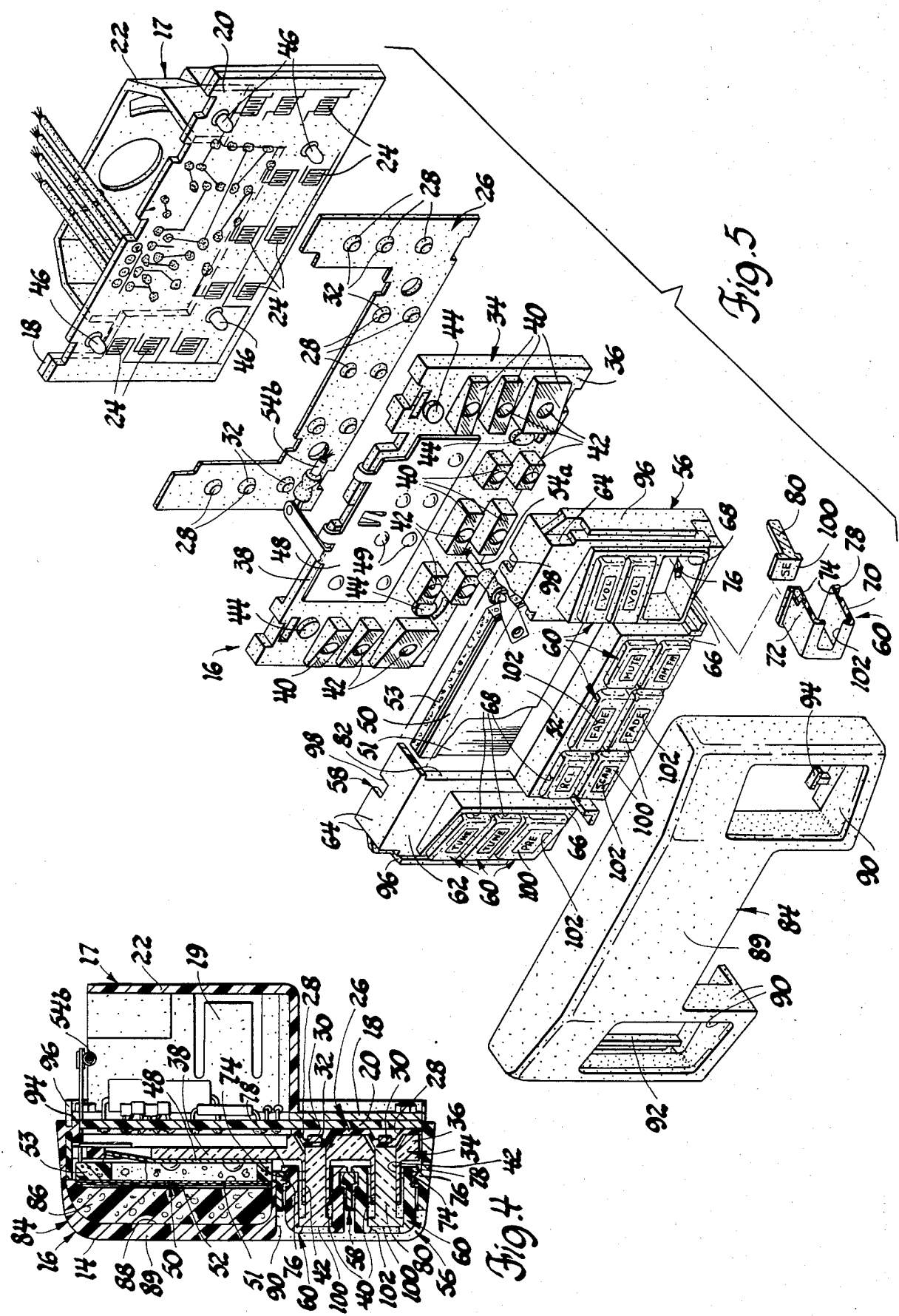

STEERING WHEEL PAD KEYBOARD SWITCH ASSEMBLY

BACKGROUND OF THE INVENTION

This invention relates generally to keyboard switch assemblies and more particularly, to steering wheel pad keyboard switch assemblies which are mounted on a vehicle steering wheel.

Such keyboard switch assemblies are already known, for instance, from U.S. Pat. No. 2,863,015 (Ahrens) which shows switch controls mounted on the spoke of a steering wheel and U.S. Pat. No. 3,544,743 (Takei) which shows a printed circuit board in a steering wheel which is operated by push button switches. Further, U.S. Pat. No. 4,374,310 (Kato) shows a steering wheel switch arrangement comprising a depressible horn pad and switches which are mounted on fixed pedestals while U.S. Pat. No. 4,383,148 (Arima); U.S. Pat. No. 4,409,584 (Arima) and U.S. Pat. No. 4,421,960 (Arima) show other electric switch assemblies which are operated by push buttons.

SUMMARY OF THE INVENTION

The object of this invention is to provide an improved steering wheel pad keyboard switch assembly.

A feature of the invention is that the steering wheel pad keyboard switch assembly is a preassembled unit which facilitates assembly into the steering wheel under factory conditions.

Another feature of the invention is that the steering wheel pad keyboard switch assembly includes a keyboard sub-assembly in which the push buttons are slideably retained in a frame member thereby facilitating assembly of the steering wheel pad keyboard switch assembly.

Still yet another feature of the invention is that the steering wheel pad keyboard switch assembly includes a horn switch which is operated in a conventional manner.

Still yet another feature of the invention is that the steering wheel pad keyboard switch assembly includes a back lighting system for the push buttons.

BRIEF DESCRIPTION OF THE DRAWINGS

Other objects and features of the invention will become apparent to those skilled in the art as the disclosure is made in the following detailed description of a preferred embodiment of the invention as illustrated in the accompanying sheets of drawing in which:

FIG. 4 is a section taken substantially along the line 4—4 of FIG. 1 looking in the direction of the arrows.

FIG. 5 is an exploded perspective view of the keyboard assembly which is shown in FIGS. 1, 2, 3 and 4.

DESCRIPTION OF THE PREFERRED EMBODIMENT

Figure 1:
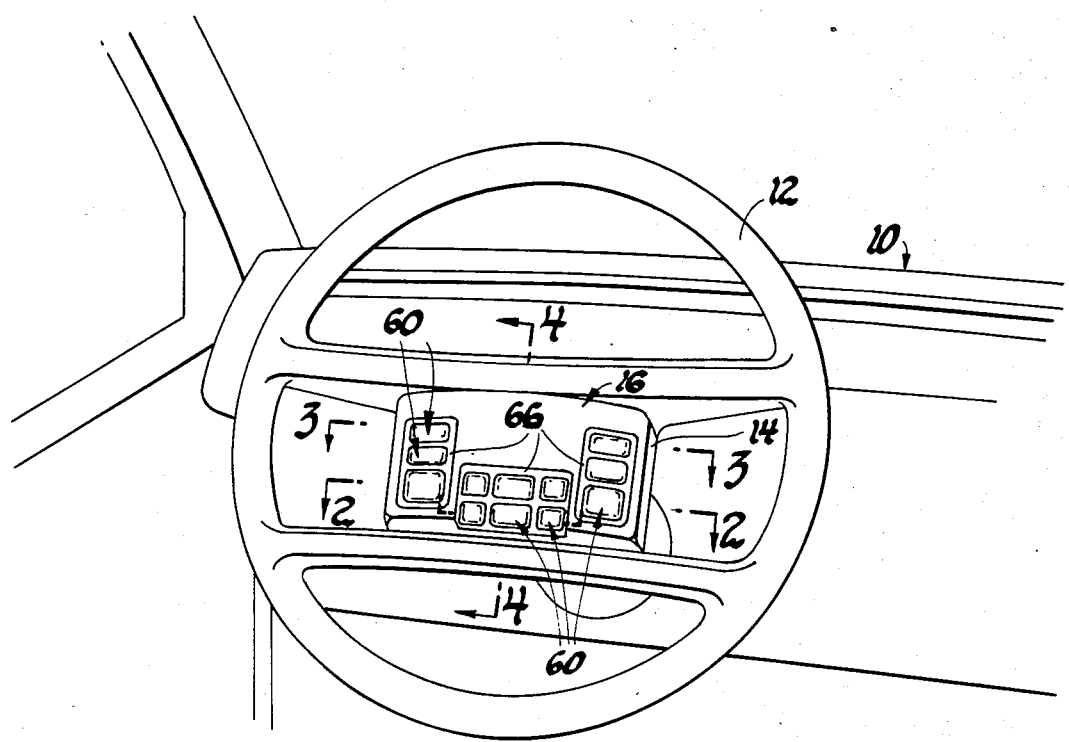
FIG. 1 is a front view of a vehicle instrument panel and steering wheel in which the steering wheel pad comprises a keyboard assembly in accordance with this invention.

Referring now to the drawing, FIG. 1 illustrates a vehicle instrument panel 10 and steering wheel 12 in which the steering wheel pad 14 comprises a keyboard assembly 16 in accordance with this invention.

Referring now to FIGS. 5, the keyboard assembly 16 comprises a base 17 which is adapted to be attached to the hub of the steering wheel 12 so as to provide the steering wheel pad 14. The base 17 includes a U-shaped support plate 18 at the periphery of an open box-like guard 22 which has latch arms 19 for securing the keyboard assembly to the hub of the steering wheel 12.

The keyboard assembly 16 further comprises a printed circuit board 20 which is mounted on the support plate 18. The printed circuit board 20 has a number of electronic components (not shown) mounted on its underside where these components are protected by the open box-like guard 22 of the base 17. These electronic components are connected into a predetermined control circuit by a circuit pattern on surfaces of the printed circuit board 20 which includes a plurality of open contact grids 24 on the upper surface. The contact grids 24 are disposed in a predetermined array within a U-shaped area which borders three sides of the printed circuit board 20 and which is preferably adhesively secured to the support plate 18 beneath.

Figure 2:
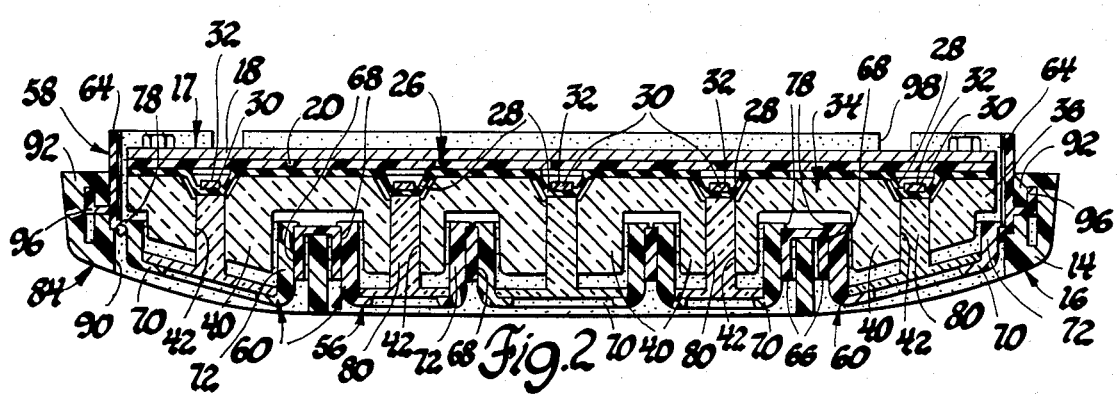
FIG. 2 is a section taken substantially along the line 2—2 of FIG. 1 looking in the direction of the arrows.

The keyboard assembly 16 also includes a U-shaped switch member 26 which is disposed on the upper surface of the U-shaped area of the printed circuit board 20. The switch member 26 comprises a sheet or membrane of elastomeric material which has a plurality of integrally molded hollow buttons 28 which correspond in number to the open contact grids 24 and which are disposed in the same predetermined array as the contact grids 24. Each hollow button 28 carries a conductive disc 30 inside, as shown in FIGS. 2, 3 and 4 so that the hollow buttons 28 form movable contacts 32 which selectively close the open contact grids 24 when the hollow buttons 28 are depressed.

The keyboard assemby 16 further includes an acrylic guide plate 34 which also serves as a light bar as explained more fully below. The guide plate 34 is disposed over the the printed circuit board 20 with the U-shaped switch member 26 sandwiched therebetween. The guide plate 34 comprises a U-shaped peripheral portion 36 along three sides thereof and a thinner pad portion 38 which is defined by a recess in the surface which faces the printed circuit board 20. This recess provides room for the soldered projecting wire ends of the electronic components which are mounted beneath the printed circuit board 20.

The U-shaped peripheral portion 36 of the guide plate 34 includes a plurality of guide bosses 40 having guide holes 42. The plurality of guide bosses 40 and guide holes 42 correspond in number to the movable contacts 32 of the switch member 26 and the open contact grids 24 of the printed circuit board 20 and they are disposed in the same predetermined array as the movable contacts 32 and the open contact grids 24.

Figure 3:
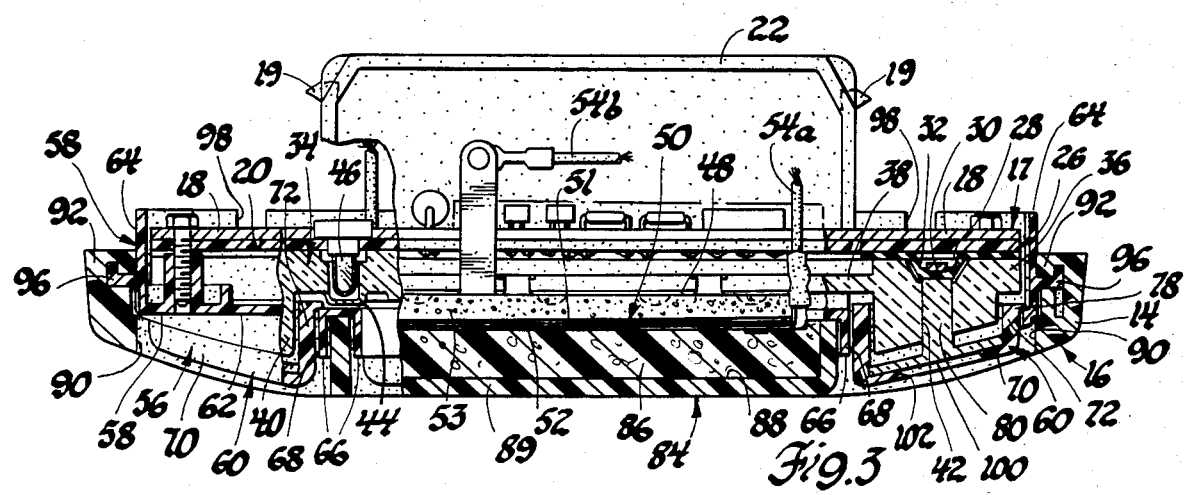
FIG. 3 is a section taken substantially along the line 3—3 of FIG. 1 looking in the direction of the arrows.

The U-shaped peripheral portion 36 of the guide plate 34 also includes four domes 44 which have cavities which open onto the surface of the guide plate which is adjacent the printed circuit board 20 as shown in FIG. 3. These cavities receive the light bulbs 46 which are plugged into sockets which are mechanically and electrically connected to the printed circuit board 20. First selected surfaces of the acrylic guide plate 34 are painted white for light reflection. Then substantially, the entire surface of the acrylic guide plate 34 is painted opaque, preferably a matte black, so that the acrylic guide plate 34 acts as a light guide or pipe which transmits the light from the light bulbs 46 to selected unpainted translucent surfaces of the guide plate 34 as explained more fully below.

A horn contact plate 48 is secured on the surface of the pad portion 38 of the guide plate 34 which is remote from the printed circuit board 20. A flexible printed circuit contact 50 lies atop the horn contact plate 48. The flexible printed circuit contact 50 comprises a thin copper sheet 51 which is secured on a Mylar support sheet 52 and which has a foamed spacer grid 53 on its exposed surface. This foamed spacer grid 53 engages the contact plate 48 and normally spaces the thin copper sheet 51 from the horn contact plate 48 as shown in FIGS. 3 and 4. However, when the flexible printed circuit contact 50 is depressed, the copper sheet 51 contacts one or more dimples 49 of the horn contact plate 48 which closes the circuit between the leads 54a and 54b to operate the vehicle horn (not shown).

The keyboard assembly 16 also includes a push button sub-assembly 56 which comprises a hardshell frame 58 and a plurality of push buttons 60. The hardshell frame 58 has a face plate 62 and four sidewalls 64 which form a housing when the hardshell frame 58 is attached to the support plate 18 of the base 17 as shown in FIG. 3 to provide a unit handled keyboard assembly 16. The frame plate 62 of the frame 58 has three raised bezels 66 which cooperatively define a plurality of slide chambers 68 which extend through the frame 58. The plurality of slide chambers 68 correspond in number to and are disposed in the same predetermined array as the guide bosses 40 and guide holes 42 of the guide plate 34.

The plurality of push buttons 60 are shaped to match respective slide chambers 68 and slideably retained in the plurality of slide chambers 68 respectively. Each push button 60 comprises an opaque hollow cap 70 which has a flanged skirt 72 which slides freely in the associated slide chamber 68. Each push button is retained in the downward or depressed direction by its side slots 74 which receive nibs 76 of the frame 58 and in the upward or raised direction by the skirt flange 78, as shown in FIG. 4, so that the frame 58 and buttons 60 are a unit-handled sub-assembly as indicated above. Each button 60 also includes a translucent stem piece 80 which is integrally attached inside the hollow cap 70 and which extends below the skirt flange 78 by a substantial amount.

When the hardshell frame 58 is attached to the support plate 18 of the base 17, the hollow caps 70 of the push buttons 60 fit over the guide bosses 40 of the guide plate 34 and the stems 80 extend through the guide holes 42 with a sliding fit to engage the hollow buttons 28 of the elastomeric switch member 26 as shown in FIGS. 2, 3 and 4. The natural resilience of the hollow elastomeric buttons 28 biases the push buttons 60 to the raised position as well as spaces the contact disks 30 from the contact grids 24.

The face plate 62 of the hardshell frame 58 also has a large rectangular hole 82 which surrounds the flexible printed circuit switch 50 which is on top of the horn contact plate 48 which is attached to the pad portion 38 of the guide plate 34.

The push button sub-assembly 56 further comprises a decorative cover 84 of soft pliable plastic material which is fitted on the frame member 58 and a thick rubber-like pad 86. The pad 86 is friction fitted into a rectangular cavity 88 of a depressible pad portion 89 of the cover 84 and the pad 86 engages the flexible printed circuit contact 50 when the decorative cover 84 is fitted on the frame member 58 so that horn switch is operated when the pad portion 89 of the cover 84 is depressed. The decorative cover 84 has three cut-outs 90 which fits around the three raised bezels 66 so that the push buttons 60 are accessible for operation. The decorative cover pad 84 also has flange pieces 92 and button hooks 94 which cooperate with side rails 96 and notches 98 of the frame member 56 to retain the cover pad 84 on the frame member 56 as shown in FIGS. 2 and 3.

The push buttons 60 are lit by a back lighting system which includes the acrylic guide plate 34 and the translucent stem pieces 80. As indicated above, selected surfaces of the guide plate 34 are painted white, and then substantially the entire surface of the acrylic guide plate 34 is painted opaque, preferably a matte black, so that the acrylic guide plate 34 acts as a light guide or pipe which transmits the light from the light bulbs 46 to selected unpainted translucent surfaces of the guide plate 34. These areas are the faces of the guide blocks 40 and the cylindrical surfaces of the guide holes 42. The light which is transmitted to these surfaces is in turn transmitted into the translucent stem pieces 80 and to the faces 100 of the stem pieces 80. These faces 100 are disposed in the windows 102 of the opaque hollow caps 70 and the translucent faces 100 are covered with indicia tabs having a translucent legend on an opaque background which preferably matches the color of the opaque hollow caps 70. The light at the faces 100 of the stem pieces 80 is then transmitted through the translucent legends to light up the messages of the legends.

We wish it to be understood that we do not desire to be limited to the exact details of construction shown and described, for obvious modifications will occur to a person skilled in the art.

We claim:

1. A steering wheel pad keyboard switch assembly for mounting on a steering wheel comprising:

a base having means for attaching the assembly to a steering wheel hub, a printed circuit which is mounted on the base and which has a plurality of open contact grids disposed in a predetermined array, a switch member which is mounted on the printed circuit and which has a plurality of movable contacts disposed in the same said predetermined array for selectively closing the contact grids, a guide plate which is mounted on the switch member and which has a plurality of guide holes disposed in the same said predetermined array for guiding operators into operative contact with the movable contacts of the switch member for selectively moving the contacts of the switch member into engagement with the contact grids, and a push button sub-assembly which overlies the guide plate and which is attached to the base to provide a unit handled assembly, said push button sub-assembly comprising a frame member having a plurality of slide chambers disposed in the same said predetermined array and a plurality of push buttons slideably retained in the plurality of slide chambers respectively, said push buttons having stem pieces which extend into the guide holes of the guide plate and act as the aforesaid operators for selectively moving the contacts of the switch member into engagement with the contact grids.

2. A steering wheel pad keyboard switch assembly for mounting on a steering wheel comprising:

a base having means for attaching the assembly to a steering wheel hub, a printed circuit board which is mounted on the base and which has a plurality of open contact grids disposed in a predetermined array within a U-shaped area which borders three sides of the printed circuit board, a U-shaped elastomeric switch member which is mounted on the U-shaped area of the printed circuit board and which has a plurality of hollow buttons each having a conductive disc inside to provide a plurality of movable contacts which are disposed in the same said predetermined array for selectively closing the contact grids, a guide plate which is disposed over the printed circuit board with the switch member sandwiched therebetween, said guide plate having a U-shaped peripheral portion which has a plurality of guide holes disposed in the same said predetermined array for guiding operators into operative contact with the movable contacts of the switch member for selectively moving the contacts of the switch member into engagement with the contact grids, said guide plate further having a pad portion nested within the U-shaped peripheral portion, a horn switch disposed on the pad portion of the guide plate, and a push button sub-assembly which overlies the guide plate and which is attached to the base to provide a unit handled assembly, said push button sub-assembly comprising a frame member having a plurality of slide chambers disposed in the same said predetermined array, a plurality of push buttons slideably retained in the plurality of slide chambers respectively, and a soft decorative cover member, said push buttons having stem pieces which extend into the guide holes of the guide plate and act as the aforesaid operators for selectively moving the contacts of the switch member into engagement with the contact grids, and said cover having a depressible portion for operating the horn switch and cut-outs providing access to the push buttons.

3. A steering wheel pad keyboard switch assembly for mounting on a steering wheel comprising:

a base having means for attaching the assembly to a steering wheel hub, a printed circuit which is mounted on the base and which has a plurality of open contact grids disposed in a predetermined array, a switch member which is mounted on the printed circuit and which has a plurality of movable contacts disposed in the same said predetermined array for selectively closing the contact grids, a guide plate which is mounted on the switch member and which has a plurality of guide bosses and guide holes which are disposed in the same said predetermined array for guiding operators into operative contact with the movable contacts of the switch member for selectively moving the contacts of the switch member into engagement with the contact grids, said guide plate being made of a translucent material and having substantially its entire surface opaque except for selected translucent surfaces comprising the faces of the guide bosses and the cylindrical surfaces of the guide holes, and a push button sub-assembly which overlies the guide plate and which is attached to the base to provide a unit handled assembly, said push button sub-assembly comprising a frame member having a plurality of slide chambers disposed in the same said predetermined array and a plurality of push buttons slideably retained in the plurality of slide chambers respectively, said push buttons having opaque hollow caps which fit over the guide bosses, translucent stem pieces which extend into the guide holes of the guide plate and act as the aforesaid operators for selectively moving the contacts of the switch member into engagement with the contact grids, and legends on the stem pieces which are disposed in windows of the opaque hollow caps.

4. A steering wheel pad keyboard switch assembly for mounting on a steering wheel comprising:

a base having means for attaching the assembly to a steering wheel hub, a printed circuit board which is mounted on the base and which has a plurality of open contact grids disposed in a predetermined array within a U-shaped area which borders three sides of the printed circuit board, a U-shaped elastomeric switch member which is mounted on the U-shaped area of the printed circuit board and which has a plurality of hollow buttons each having a conductive disc inside to provide a plurality of movable contacts which are disposed in the same said predetermined array for selectively closing the contact grids, a guide plate which is disposed over the printed circuit board with the switch member sandwiched therebetween, said guide plate having a U-shaped peripheral portion which has a plurality of guide bosses and guide holes disposed in the same said predetermined array for guiding operators into operative contact with the movable contacts of the switch member for selectively moving the contacts of the switch member into engagement with the contact grids, said guide plate further having a pad portion nested within the U-shaped peripheral portion, said guide plate being made of a translucent material and having substantially its entire surface opaque except for selected translucent surfaces comprising the faces of the guide bosses and the cylindrical surfaces of the guide holes, a horn switch disposed on the pad portion of the guide plate, and a push button sub-assembly which overlies the guide plate and which is attached to the base to provide a unit handled assembly, said push button sub-assembly comprising a frame member having a plurality of bezels which cooperatively define a plurality of slide chambers disposed in the same said predetermined array, a plurality of push buttons slideably retained in the plurality of slide chambers respectively, and a soft decorative cover, said push buttons having opaque hollow caps which fit over the guide bosses, translucent stem pieces which extend into the guide holes of the guide plate and act as the aforesaid operator for selectively moving the contacts of the switch member into engagement with the contact grids, and legends on the stem pieces which are disposed in windows of the opaque hollow caps, and said cover having a depressible portion for operating the horn switch and cut-outs fitted around the bezels to provide access to the push buttons.

5. A steering wheel pad keyboard switch assembly for mounting on a steering wheel comprising:

a base having means for attaching the assembly to a steering wheel hub, a printed circuit which is mounted on the base and which has a plurality of open contact grids disposed in a predetermined array, an elastomeric switch member which is mounted on the printed circuit and which has a plurality of buttons each having a conductive portion to provide a plurality of movable contacts which are disposed in the same said predetermined array for selectively closing the contact grids, a guide plate which is mounted on the switch member and which has a plurality of guide holes disposed in the same said predetermined array for guiding operators into operative contact with the movable contacts of the switch member for selectively moving the contacts of the switch member into engagement with the contact grids, and a push button sub-assembly which overlies the guide plate and which is attached to the base to provide a unit handled assembly, said push button sub-assembly comprising a frame member having a plurality of slide chambers disposed in the same said predetermined array and a plurality of push buttons slideably retained in the plurality of slide chambers respectively.

said push buttons having stem pieces which extend into the guide holes of the guide plate and act as the aforesaid operators for selectively moving the contacts of the switch member into engagement with the contact grids.

6. A steering wheel pad keyboard switch assembly for mounting on a steering wheel comprising:

a base having means for attaching the assembly to a steering wheel hub, a printed circuit board which is mounted on the base and which has a plurality of open contact grids disposed in a predetermined array within an area which borders at least one side of the printed circuit board, an elastomeric switch member which is mounted on the area of the printed circuit board and which has a plurality of buttons each having a conductive portion to provide a plurality of movable contacts which are disposed in the same said predetermined array for selectively closing the contact grids, a guide plate which is disposed over the printed circuit board with the switch member sandwiched therebetween, said guide plate having a peripheral portion which has a plurality of guide holes disposed in the same said predetermined array for guiding operators into operative contact with the movable contacts of the switch member for selectively moving the contacts of the switch member into engagement with the contact grids, said guide plate further having a pad portion bounded in part by the peripheral portion, a horn switch disposed on the pad portion of the guide plate, and a push button sub-assembly which overlies the guide plate and which is attached to the base to provide a unit handled assembly, said push button sub-assembly comprising a frame member having a plurality of slide chambers disposed in the same said predetermined array, a plurality of push buttons slideably retained in the plurality of slide chambers respectively, and a soft decorative cover member, said push buttons having stem pieces which extend into the guide holes of the guide plate and act as the aforesaid operators for selectively moving the contacts of the switch member into engagement with the contact grids, and said cover having a depressible portion for operating the horn switch and cut-outs providing access to the push buttons.

7. A steering wheel pad keyboard switch assembly for mounting on a steering wheel comprising:

a base having means for attaching the assembly to a steering wheel hub, a printed circuit board which is mounted on the base and which has a plurality of open contact grids disposed in a predetermined array within an area which borders at least one side of the printed circuit board, an elastomeric switch member which is mounted on the area of the printed circuit board and which has a plurality of buttons each having a conductive portion to provide a plurality of movable contacts which are disposed in the same said predetermined array for selectively closing the contact grids, a guide plate which is disposed over the printed circuit board with the switch member sandwiched therebetween, said guide plate having a peripheral portion which has a plurality of guide bosses and guide holes disposed in the same said predetermined array for guiding operators into operative contact with the movable contacts of the switch member for selectively moving the contacts of the switch member into engagement with the contact grids, said guide plate further having a pad portion bounded in part by the peripheral portion, said guide plate being made of a translucent material and having substantially its entire surface opaque except for selected translucent surfaces comprising the faces of the guide bosses and the cylindrical surfaces of the guide holes, a horn switch disposed on the pad portion of the guide plate, and a push button sub-assembly which overlies the guide plate and which is attached to the base to provide a unit handled assembly, said push button sub-assembly comprising a frame member having a plurality of bezels which cooperatively define a plurality of slide chambers disposed in the same said predetermined array, a plurality of push buttons slideably retained in the plurality of slide chambers respectively, and a soft decorative cover, said push buttons having opaque hollow caps which fit over the guide bosses, translucent stem pieces which extend into the guide holes of the guide plate and act as the aforesaid operators for selectively moving the contacts of the switch member into engagement with the contact grids, and legends on the stem pieces which are disposed in windows of the opaque hollow caps, and said cover having a depressible portion for operating the horn switch and cut-outs fitted around the bezels to provide access to the push buttons.

* * * * *